United States Patent
Goodman et al.

(10) Patent No.: US 8,970,656 B2
(45) Date of Patent: Mar. 3, 2015

(54) STATIC AND DYNAMIC VIDEO CALLING AVATARS

(71) Applicant: Verizon Patent and Licensing Inc., Basking Ridge, NJ (US)

(72) Inventors: Lee N. Goodman, Tyngsboro, MA (US); Elliot G. Eichen, Arlington, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 151 days.

(21) Appl. No.: 13/722,493

(22) Filed: Dec. 20, 2012

(65) Prior Publication Data
US 2014/0176662 A1 Jun. 26, 2014

(51) Int. Cl.
*H04N 7/14* (2006.01)
*H04W 4/00* (2009.01)
*H04N 7/15* (2006.01)

(52) U.S. Cl.
CPC ............... *H04N 7/141* (2013.01); *H04W 4/00* (2013.01); *H04N 7/157* (2013.01)
USPC ..................... 348/14.07; 345/473; 348/14.01; 348/14.02; 348/14.03; 348/14.1; 348/14.12; 370/276; 455/412.1; 455/413; 455/418; 482/8; 702/184; 704/235; 709/203; 709/204; 709/218; 715/706; 715/719; 715/757; 715/780; 725/13; 725/14

(58) Field of Classification Search
CPC ...... H04N 7/15; H04N 7/147; H04N 21/4788
USPC ................. 345/473; 348/14.01, 14.02, 14.03, 348/14.07, 14.1, 14.12; 370/276; 455/413, 455/418, 412.1; 704/235; 709/204, 203, 709/218; 715/780, 706, 719, 757; 482/8; 702/184; 725/13, 14

See application file for complete search history.

(56) References Cited

U.S. PATENT DOCUMENTS

| | | | | |
|---|---|---|---|---|
| 5,736,982 | A * | 4/1998 | Suzuki et al. | 715/706 |
| 8,113,991 | B2 * | 2/2012 | Kutliroff | 482/8 |
| 8,212,856 | B2 * | 7/2012 | Modai et al. | 348/14.12 |
| 8,230,458 | B2 * | 7/2012 | Amento et al. | 725/13 |
| 8,239,487 | B1 * | 8/2012 | Hoffman et al. | 709/218 |
| 8,284,233 | B2 * | 10/2012 | Bennett et al. | 348/14.1 |
| 8,428,908 | B2 * | 4/2013 | Lawler et al. | 702/184 |
| 8,432,430 | B2 * | 4/2013 | Jun et al. | 348/14.01 |
| 8,443,039 | B2 * | 5/2013 | Hoffman et al. | 709/203 |
| 8,510,413 | B1 * | 8/2013 | Hoffman et al. | 709/218 |
| 8,626,126 | B2 * | 1/2014 | Goertz et al. | 455/412.1 |
| 8,631,428 | B2 * | 1/2014 | Scott et al. | 725/14 |
| 8,683,354 | B2 * | 3/2014 | Khandelwal et al. | 715/757 |
| 8,723,914 | B2 * | 5/2014 | Mackie et al. | 348/14.07 |
| 8,725,507 | B2 * | 5/2014 | Cortez et al. | 704/235 |
| 8,730,297 | B2 * | 5/2014 | Fornell et al. | 348/14.12 |
| 8,739,037 | B1 * | 5/2014 | Hoffman et al. | 715/706 |
| 2008/0090553 | A1 * | 4/2008 | Wan et al. | 455/413 |
| 2008/0151786 | A1 * | 6/2008 | Li et al. | 370/276 |
| 2008/0158334 | A1 * | 7/2008 | Reponen et al. | 348/14.02 |
| 2010/0216448 | A1 * | 8/2010 | Jeon et al. | 455/418 |

(Continued)

*Primary Examiner* — Gerald Gauthier

(57) ABSTRACT

A communication device may include logic configured to detect a request to initiate a video call by the user of the communication device; select an avatar for the video call, wherein the avatar corresponds to an image selected by the user to be used as a replacement for a video stream for video calls associated with the user; determine a facial expression associated with the user of the communication device; select an avatar facial expression for the selected avatar, based on the determined facial expression; and incorporate the selected avatar facial expression into a video stream associated with the video call.

20 Claims, 13 Drawing Sheets

(56) References Cited

U.S. PATENT DOCUMENTS

| | | | |
|---|---|---|---|
| 2012/0066596 A1* | 3/2012 | Feng et al. | 715/719 |
| 2012/0182381 A1* | 7/2012 | Abate et al. | 348/14.03 |
| 2012/0198380 A1* | 8/2012 | Czertok | 715/780 |
| 2012/0287220 A1* | 11/2012 | Ravi et al. | 348/14.02 |
| 2013/0257877 A1* | 10/2013 | Davis | 345/473 |
| 2013/0258040 A1* | 10/2013 | Kaytaz et al. | 348/14.07 |
| 2014/0164501 A1* | 6/2014 | Herger et al. | 709/204 |
| 2014/0176662 A1* | 6/2014 | Goodman et al. | 348/14.07 |

* cited by examiner

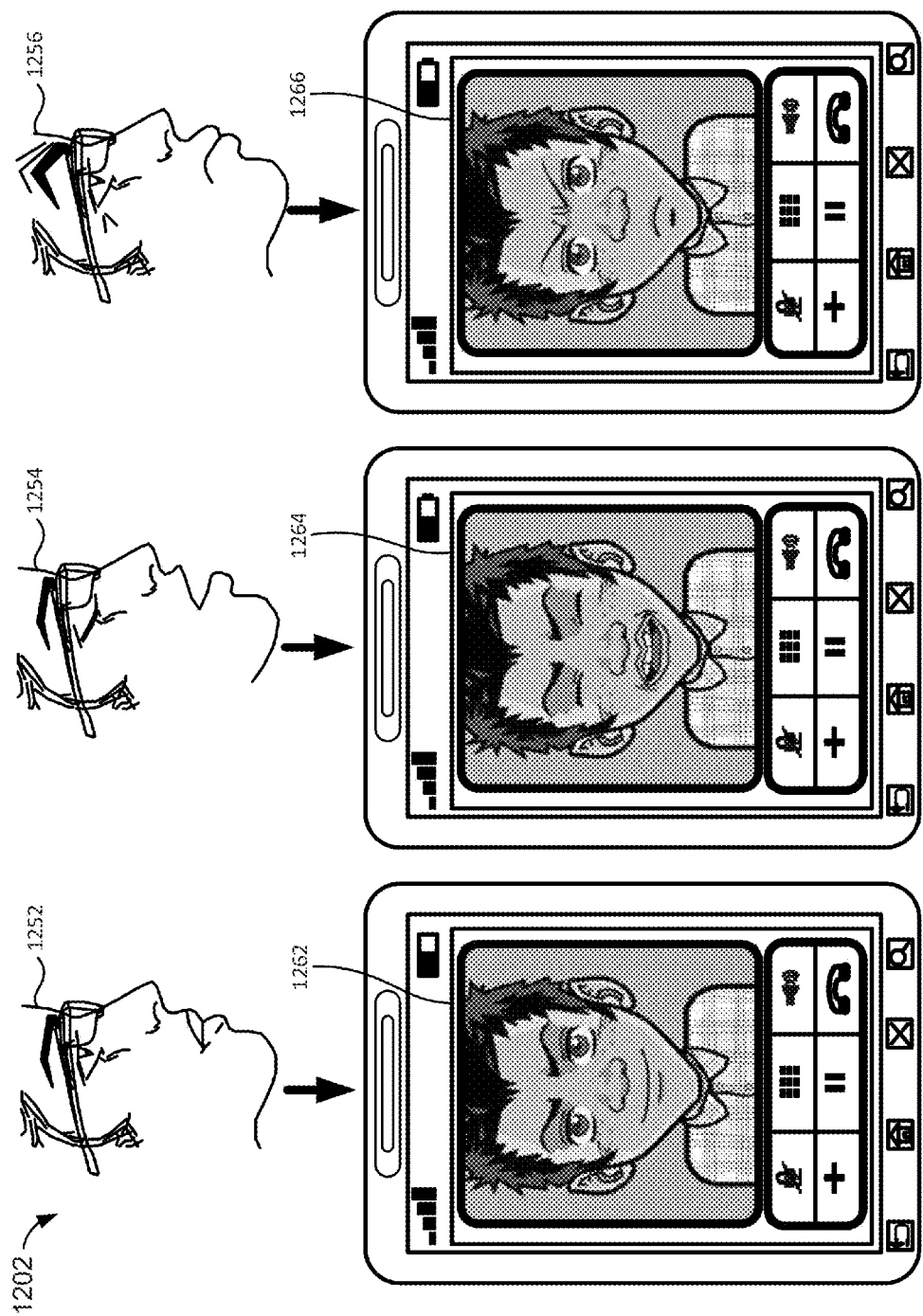

STATIC AND DYNAMIC VIDEO CALLING AVATARS

BACKGROUND INFORMATION

A video calling service may enable two or more users to communicate using both audio signals and video images. A first user's image may be captured by a camera associated with the first user's communication device and transmitted to a second user's communication device, whereupon the captured image may be displayed in a display device associated with the second user's communication device. However, transmission of video images may not always be desirable while using a video calling service. As an example, bandwidth availability at a user's location may prevent acceptable video quality. As another example, a user may not want to provide video images for a video call, as the user may not want to reveal what the user looks like, the user may not be dressed properly, or the user may not want to reveal the location from which the user is calling.

BRIEF DESCRIPTION OF THE DRAWINGS

FIGS. 12A-12B are diagrams of an example of using a dynamic avatar in a video call according to an implementation described herein.

DETAILED DESCRIPTION OF PREFERRED EMBODIMENTS

Figure 1:
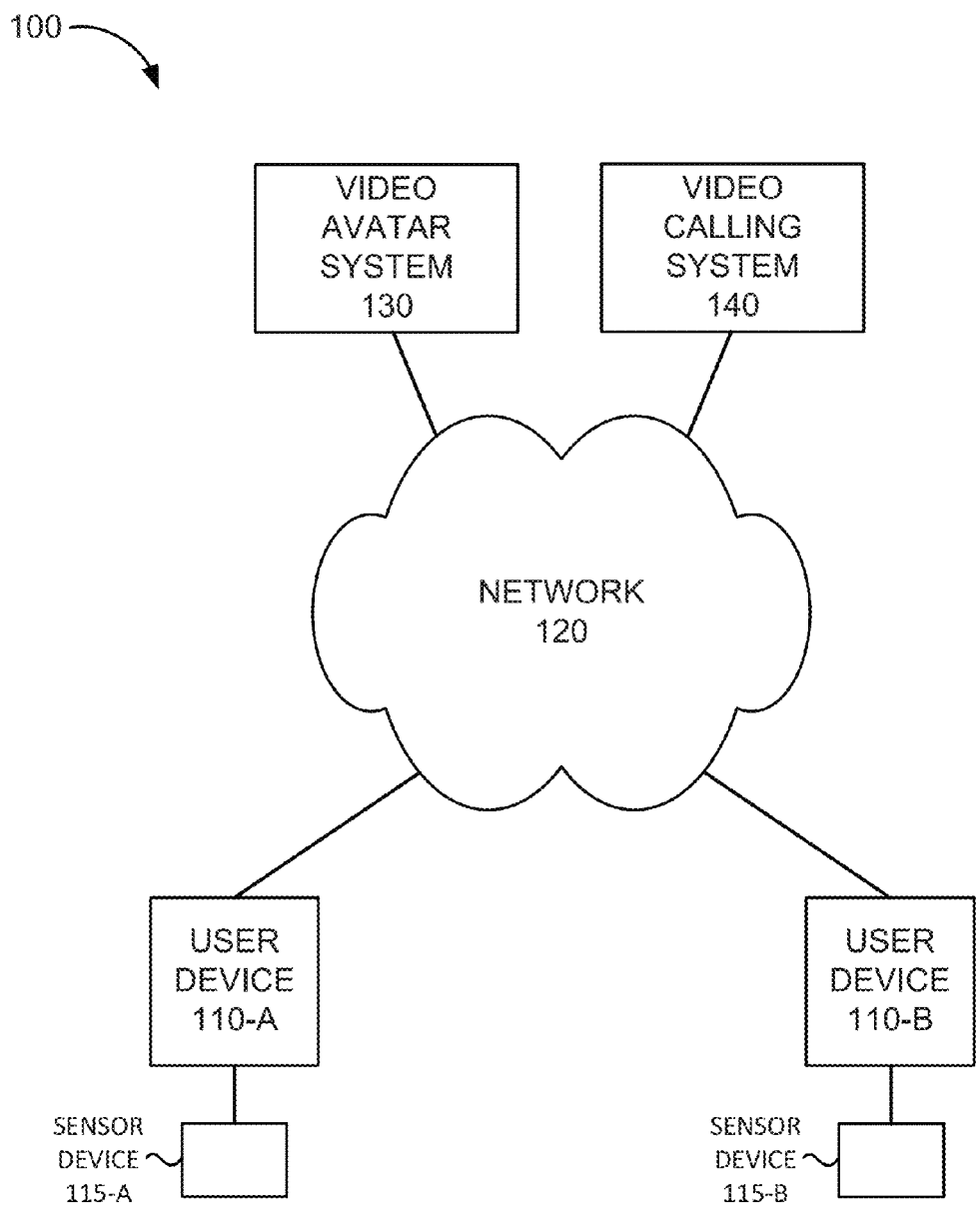
FIG. 1 is a diagram illustrating an exemplary environment according to an implementation described herein.

The following detailed description refers to the accompanying drawings. The same reference numbers in different drawings identify the same or similar elements.

An implementation described herein relates to static and dynamic avatars for a video calling service. An avatar may correspond to a graphical representation of a user, such as an image, an icon, or a three-dimensional representation of a character. The avatar may be incorporated into a video stream of a video call and may be used in place of video images of the user. An avatar may include a static avatar, which may include a static image. An avatar may include a dynamic avatar, which may change depending on the user's head, eye, and/or eye movement.

An avatar service may be provided by a video client installed on a user's communication device, such as on a mobile phone or on a personal computer. However, a client-based avatar service may not be desirable. For example, different third-party video clients may be associated with different avatar formats or procedures, which may not be compatible with a provider's video calling service. An implementation described herein relates to a cloud-based avatar service. A user may select an avatar from a list of available avatar or may upload an avatar to a video avatar service in the cloud. A video calling service may request an avatar for the user from the video avatar service when the user sends or receives a video call, may receive the requested avatar, and may incorporate the received avatar into the video stream of the video call.

Furthermore, a user may select different avatars for different conditions associated with a video call. For example, a user may select to use a first avatar if the user is in a first location (e.g., home) and may select to use a second avatar when the user is in a second location (e.g., at work). As another example, a user may select to use a first avatar during a first range of hours in a day and may select to use a second avatar during a second range of hours in a day. As yet another example, a user may select to user a first avatar during a first day of the week and a second avatar during a second day of the week. As yet another example, a user may select to use a first avatar for a first group of contacts and a second avatar for a second group of contacts. As yet another example, a user may select to use a first avatar when a first status is associated with the user and may select to use a second avatar when a second status is associated with the user.

An implementation described herein may further relate to a dynamic avatar. A dynamic avatar may change facial expression based on a user's facial expressions. A user's communication device may be associated with one or more sensors that may capture an image of the user's face. For example, a user may wear a pair of glasses that include one or more cameras to capture an image of the user's head and/or face. The image may be analyzed to determine a position of the user's head, the user's eyebrows, the user's cheekbones, the user's lips, and/or other features of the user's face, and the determined positions may be used to identify a facial expression associated with the user. The identified facial expression may be used to select an avatar image with a facial expression that corresponds to the identified facial expression. The avatar image with the facial expression may be incorporated into the video stream of the video call initiated or received by the user.

In one implementation, the processing to determine the facial expression of the avatar may be performed by the user's communication device. In another implementation, some or all of the processing to determine the facial expression of the avatar may be performed by a video avatar system. For example, a video stream from the user's communication device may be sent to the video avatar system and the video avatar system may generate a dynamic avatar based on the video stream received from the user's communication device.

In some situations, images of a user's face may not be available. An implementation described herein may further relate to determining a facial expression for an avatar based on an audio signal associated with a video call. For example, if the user is talking, the avatar associated with the user may be modified to include moving lips. An implementation described herein may further relate to determining a facial expression for an avatar based on user input. As an example, a user may select an avatar facial expression from a set of icons, wherein each icon represents a facial expression. As another example, a user may manipulate an avatar image to generate an avatar facial expression.

FIG. 1 is a diagram illustrating an exemplary environment 100 according to an implementation described herein. As shown in FIG. 1, environment 100 may include a user devices 110-A and 110-B (referred to herein collectively as "user devices 110" and individually as "user device 110"), sensor devices 115-A and 110-B (referred to herein collectively as "sensor devices 115" and individually as "sensor device 115"), a network 120, a video avatar system 130, and a video calling system 140.

User device 110 may include any device capable of sending and/or receiving video calls. For example, user device 110 may include a mobile phone, a smart phone, a tablet computer, a laptop computer, a personal digital assistant (PDA), or another type of portable communication device. As another example, user device 110 may include a desktop computer, a set-top box, a telephone device with video capability, and/or another type of communication device.

Sensor device 115 may include one or more devices to determine a user's facial expression. For example, sensor device 115 may determine a position of the user's head, a position of the user's eyes, a position of the user's eyebrows, a position of the user's cheekbones, a position of the user's mouth and/or lips, and/or a position of another feature associated with the user. In some implementations, sensor device 115 may include one or more cameras included in user device 110. In other implementations, sensor device 115 may include one or more cameras mounted to a pair of glasses, or another type of headpiece, worn by the user. In some implementations, the pair of glasses may include additional sensors. As an example, the pair of glasses may include a position sensor (e.g., a gyroscope) to sense the position of the user's head. As another example, the pair of glasses may include one or more sensors to sense muscle movement on the user's head, such as one or more mechanical pressure sensors, one or more piezoelectric sensors, and/or another type of sensor to detect the user's muscle movements.

Network 120 may enable user device 110, video avatar system 130, and/or video calling system 140 to communicate with each other. Network 120 may include one or more wired and/or wireless networks. For example, network 120 may include a cellular network, the Public Land Mobile Network (PLMN), a second generation (2G) network, a third generation (3G) network, a fourth generation (4G) network (e.g., a long term evolution (LTE) network), a fifth generation (5G) network, a code division multiple access (CDMA) network, a global system for mobile communications (GSM) network, a general packet radio services (GPRS) network, a combination of the above networks, and/or another type of wireless network. Additionally, or alternatively, network 120 may include a local area network (LAN), a wide area network (WAN), a metropolitan area network (MAN), an ad hoc network, an intranet, the Internet, a fiber optic-based network (e.g., a fiber optic service network), a satellite network, a television network, and/or a combination of these or other types of networks.

Video avatar system 130 may include one or more devices, such as server devices, that manage avatars for users. For example, a user may select an avatar and the selected avatar may be stored by video avatar system 130 in association with the user. When the user sends or receives a video call, video avatar system 130 may identify the selected avatar and may provide the selected avatar to be incorporated into a video stream of a video call associated with the user. As another example, when the user sends or receives a video call, a video stream from user device 110 associated with the user may be directed to video avatar system 130. Video avatar system 130 may analyze images in the video stream to determine a facial expression made by the user and may select an avatar image that includes a facial expression that correspond to the determined facial expression.

Video calling system 140 may include one or more devices, such as server devices, that provide a video calling service for user devices 110. For example, when a first user, associated with user device 110-A, wants to initiate a video call to a second user, associated with user device 110-B, the first user may activate a video calling application on user device 110-A and may select to contact the second user. User device 110-A may contact video calling system 140 with a request to set up a video calling session between user device 110-A and user device 110-B. Video calling system 140 may identify and/or locate user device 110-B and may set up a video calling session between user device 110-A and user device 110-B, if the second user is available and answers the call.

Furthermore, video calling system 140 may determine whether an avatar is to be used for the first user, the second user, or both the first user and the second user. If video calling system 140 determines that an avatar is to be used in the video call for the first user and/or the second user, video calling system 140 may request an avatar for the first user and/or the second user from video avatar system 130, may receive the avatar for the first user and/or the second user and incorporate the avatar into the video stream. For example, if both the first user and the second user requested to use an avatar during the video call, a first avatar, associated with the first user, may be sent in a video stream to user device 110-B and a second avatar, associated with the second user, may be sent in a video stream to user device 110-A.

Although FIG. 1 show exemplary components of environment 100, in other implementations, environment 100 may include fewer components, different components, differently arranged components, or additional components than depicted in FIG. 1. Additionally or alternatively, one or more components of environment 100 may perform functions described as being performed by one or more other components of environment 100.

Figure 2:
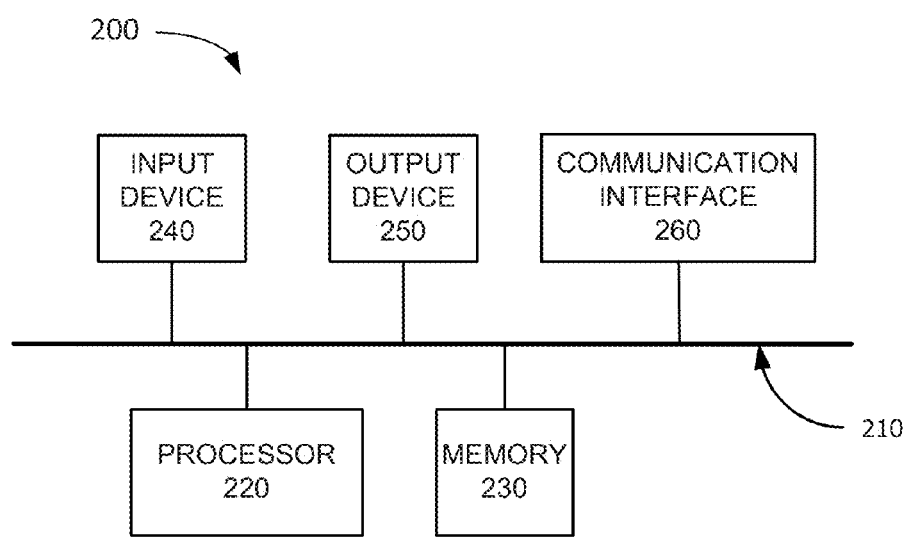
FIG. 2 is a diagram illustrating an exemplary device that may be included in a component of the environment of FIG. 1 according to an implementation described herein.

FIG. 2 is a diagram illustrating an exemplary device 200 that may be included in a component of the environment of FIG. 1 according to an implementation described herein. User device 110, sensor device 115, video avatar system 130, and/or video calling system 140 may each include one or more devices 200. As shown in FIG. 2, device 200 may include a bus 210, a processor 220, a memory 230, an input device 240, an output device 250, and a communication interface 260.

Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to an antenna for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFD)) interface, a near-field communications (NFC) wireless interface, and/or any other type of interface that converts data from one form to another form.

As will be described in detail below, device 200 may perform certain operations relating to providing static and/or dynamic avatars for a video call. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally or alternatively, one or more components of device 200 may perform one or more tasks described as being performed by one or more other components of device 200.

Figure 3A:
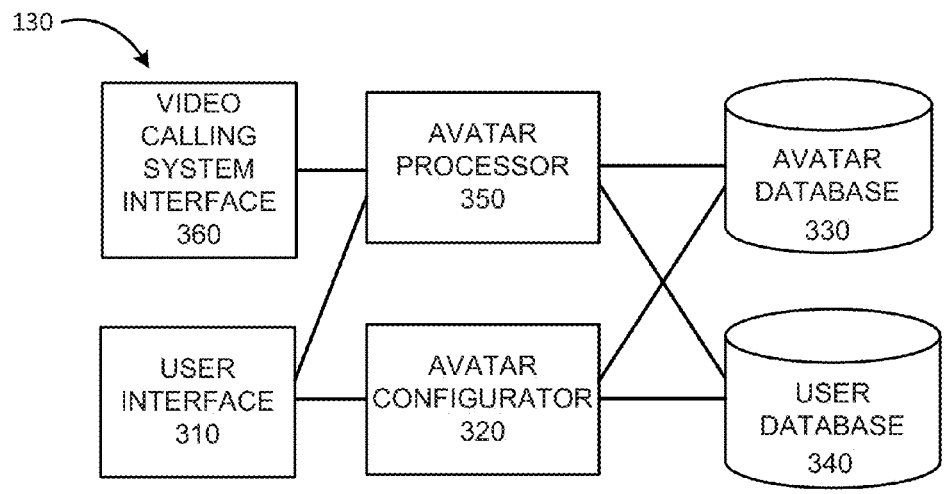
FIG. 3A is a diagram illustrating exemplary functional components of the video avatar system of FIG. 1 according to an implementation described herein.

FIG. 3A is a diagram illustrating exemplary functional components of video avatar system 130 according to an implementation described herein. The functional components of video avatar system 130 may be implemented, for example, via processor 220 executing instructions from memory 230. Alternatively, some or all of the functional components of video avatar system 130 may be implemented via hard-wired circuitry. As shown in FIG. 3A, video avatar system 130 may include a user interface 310, an avatar configurator 320, an avatar database 330, a user database 340, an avatar processor 350, and a video calling system interface 360.

User interface 310 may enable communication with user device 110. For example, user interface 310 may receive a request from user device 110 to select an avatar for the user of user device 110, and/or may receive information specifying a condition to be associated with the selected avatar. Avatar configurator 320 may configure user database 340 to associate a particular avatar with a particular user. For example, when a user requests to select an avatar, avatar configurator 320 may provide to user device 110 a list of available avatars stored in avatar database 330. Additionally or alternatively, avatar configurator 320 may enable a user to upload an avatar and may provide avatar specifications to the user (e.g., image format, image size, etc.). Furthermore, avatar configurator 320 may enable the user to associate a particular condition with a particular avatar, such as a particular location, a particular time of day, a particular day of week, a particular status associated with the user, a particular set of contacts, and/or another type of condition.

Avatar database 330 may store avatars that may be selected or uploaded by users. For example, avatar database 330 may store a static avatar along with a description of the static avatar. As another example, avatar database 330 may store a dynamic avatar. A dynamic avatar may include a series of avatar images with various facial expressions. For example, the dynamic avatar may include an avatar image that is smiling, an avatar image that is frowning, an avatar image that appears to be talking, etc. User database 340 may store avatar information for particular users. Exemplary information that may be stored in user database 340 is described below with reference to FIG. 4A.

Avatar processor 350 may process requests for an avatar and/or may select a particular avatar image for a particular video call or a particular point of time during a video call. For example, avatar processor 350 may receive a request for an avatar from video calling system 140 for a particular user, may identify an avatar associated with the particular user, and may provide the identified avatar to video calling system 140. As another example, avatar processor 350 may receive a video stream from user device 110, may analyze an image from the video stream to determine a facial expression associated with the user of user device 110, may select an avatar image that includes a facial expression corresponding to the determined facial expression, and may provide the selected avatar image to video calling system 140 to be incorporated into a video stream associated with the user.

Video calling system interface 360 may communicate with video calling system 140. For example, video calling system interface 360 may receive a request for an avatar from video calling system 140 and may provide a requested avatar to video calling system 140.

Although FIG. 3A shows exemplary functional components of video avatar system 130, in other implementations, video avatar system 130 may include fewer functional components, different functional components, differently arranged functional components, or additional functional components than depicted in FIG. 3A. Additionally or alternatively, one or more functional components of video avatar system 130 may perform functions described as being performed by one or more other functional components of video avatar system 130.

Figure 3B:
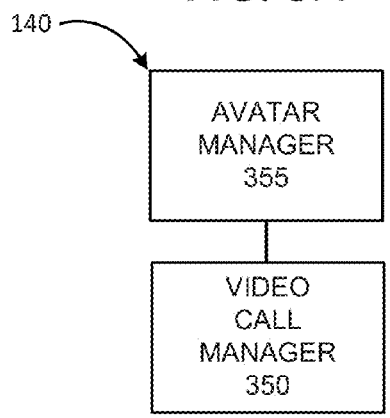
FIG. 3B is a diagram illustrating exemplary functional components of the video calling system of FIG. 1 according to an implementation described herein.

FIG. 3B is a diagram illustrating exemplary functional components of video calling system 140 according to an implementation described herein. The functional components of video calling system 140 may be implemented, for example, via processor 220 executing instructions from memory 230. Alternatively, some or all of the functional components of video calling system 140 may be implemented via hard-wired circuitry. As shown in FIG. 3B, video calling system 140 may include a video call manager 350 and an avatar manager 355.

Video call manager 350 may manage video calls between user device 110-A and user device 110-B. For example, video call manager 350 may set up a video call session between user device 110-A and user device 110-B, may maintain information relating to the video call, may terminate the video call when either user device 110-A or user device 110-B hangs up, and/or may manage other aspects of the video call.

Avatar manager 355 may manage avatars associated with the video call being managed by video call manager 350. For example, avatar manager 355 may determine whether an avatar is to be used for a first user and/or a second user for the video call and may request an avatar for the first user and/or the second user from video avatar system 130 when an avatar is to be used for the video call. Avatar manager 355 may determine that an avatar is to be used when a user requests to use an avatar for the video call, when a condition is satisfied for which the user has previously indicated that an avatar is to be used, when a bandwidth and/or signal strength for user device 110 does not permit a video stream to be used, and/or based on another criterion. Avatar manager 355 may incorporate an avatar received from video avatar system 130 into a video stream associated with a user. For example, if a first user, associated with user device 110-A, selects to use an avatar, avatar manager 355 may replace a video stream associated with the first user, with the avatar and may provide a video stream that includes the avatar to user device 110-B, associated with a second user.

Although FIG. 3B shows exemplary functional components of video calling system 140, in other implementations, video calling system 140 may include fewer functional components, different functional components, differently arranged functional components, or additional functional components than depicted in FIG. 3B. Additionally or alternatively, one or more functional components of video calling system 140 may perform functions described as being performed by one or more other functional components of video calling system 140.

Figure 3C:
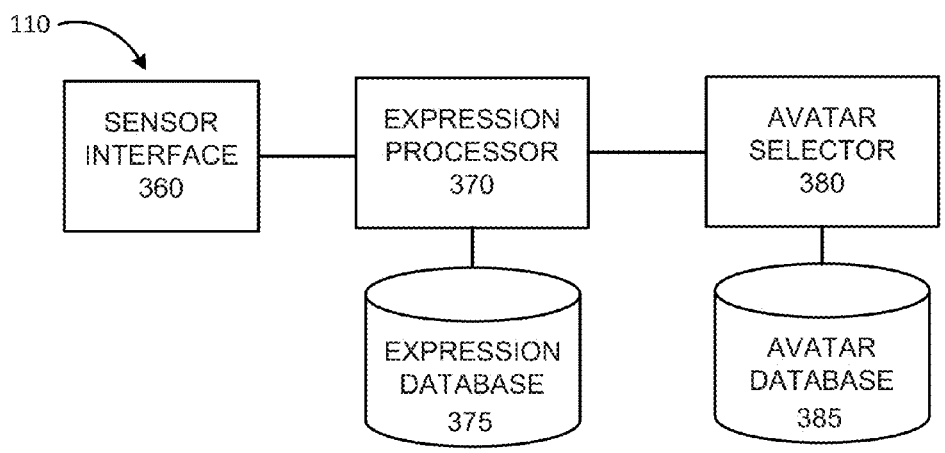
FIG. 3C is a diagram illustrating exemplary functional components of the user device of FIG. 1 according to an implementation described herein.

FIG. 3C is a diagram illustrating exemplary functional components of user device 110 according to an implementation described herein. The functional components of user device 110 may be implemented, for example, via processor 220 executing instructions from memory 230. Alternatively, some or all of the functional components of user device 110 may be implemented via hard-wired circuitry. As shown in FIG. 3C, user device 110 may include a sensor interface 360, an expression processor 370, an expression database 375, an avatar selector 380, and an avatar database 385.

Sensor interface 360 may enable user device 110 to communicate with sensor device 115. For example, sensor interface 360 may obtain an image of the user's face and/or head from sensor device 115. Expression processor 370 may analyze an image received via sensor interface 360. For example, expression processor 370 may perform a feature detection algorithm, such as an edge detection algorithm, a block detection algorithm, a template detection algorithm, and/or another type of algorithm to identify features of the user's face, such as the user's head position, a position of the user's eyebrows, a position of the user's eyes, a position of the user's lips and/or mouth, and/or a position of another feature of the user's face. Expression processor 370 may generate a feature vector based on the feature detection algorithm and may identify a particular facial expression based on the generated feature vector by accessing expression database 375. Expression database 375 may store information relating a particular feature vector, or a set of feature vectors, to a particular facial expression. Exemplary information that may be stored in expression database 375 is described below with reference to FIG. 4B.

Avatar selector 380 may select a particular avatar image based on a particular facial expression. In some implementations, avatar selector 380 may select the particular avatar image based on the facial expression determined by analyzing an image obtained from sensor 115. In other implementations, avatar selector 380 may select the particular avatar image based on other criteria. For example, avatar selector 380 may select the particular avatar image based on audio signals associated with the user. As another example, avatar selector 380 may select the particular avatar image based on user input. Avatar database 385 may store information relating a particular facial expression to a particular avatar image. Exemplary information that may be stored in avatar database 385 is described below with reference to FIG. 4C.

Although FIG. 3C shows exemplary functional components of user device 110, in other implementations, user device 110 may include fewer functional components, different functional components, differently arranged functional components, or additional functional components than depicted in FIG. 3C. Additionally or alternatively, one or more functional components of user device 110 may perform functions described as being performed by one or more other functional components of user device 110. Furthermore, while the functional components of FIG. 3C have been described as being included in user device 110, in other implementations, some or all of the functional components of FIG. 3C may be implemented by avatar processor 350 of video avatar system 130.

Figure 4A:
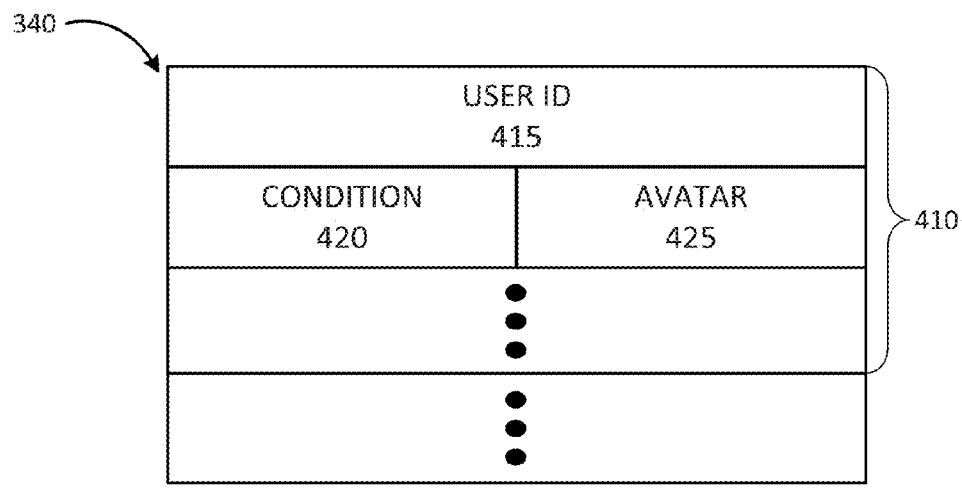
FIG. 4A is a diagram illustrating exemplary components of a user database of FIG. 3A according to an implementation described herein.

FIG. 4A is a diagram illustrating exemplary components of user database 340 according to an implementation described herein. As shown in FIG. 4A, user database 340 may include one or more user records 410 (referred to herein collectively as "user records 410" and individually as "user record 410"). Each user record 410 may store avatar information associated with a particular user. Use record 410 may include a user identifier (ID) field 415 and one or more entries that include a condition field 420 and a corresponding avatar field 425.

User ID field 415 may include information that identifies a particular user. For example, user ID field 415 may store a username associated with the particular user, an account number associated with a user, and/or another identifier associated with the user. As another example, user ID field 415 may store an identifier associated with user device 110 associated with the user, such as a Mobile Subscriber Integrated Services Digital Network number (MSISDN), an International Mobile Subscriber Identity (IMSI) number, a mobile identification number (MIN), an International Mobile Equipment Identifier amp, an Integrated Circuit Card Identifier (ICCI), and/or any other mobile communication device identifier.

Condition field 420 may include information identifying a particular condition. For example, condition field 420 may include information identifying a particular location, a particular time of day, a particular day of the week, a particular status associated with the user, a particular group of contacts associated with the user, and/or another type of condition. Avatar field 425 may store information identifying a particular avatar associated with the particular condition.

Although FIG. 4A shows exemplary components of user database 340, in other implementations, user database 340 may include fewer components, different components, differently arranged components, or additional components than depicted in FIG. 4A.

Figure 4B:
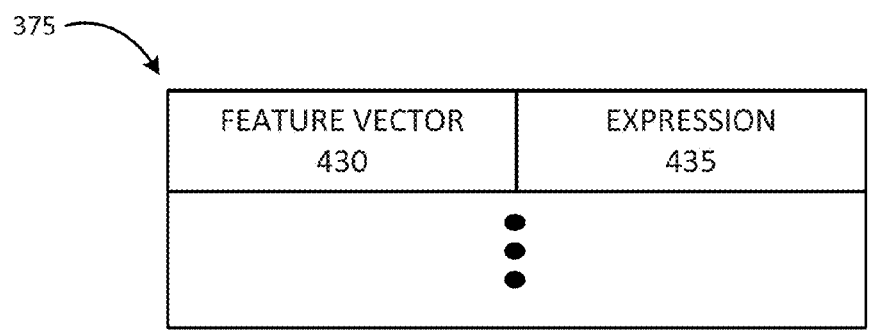
FIG. 4B is a diagram illustrating exemplary components of an expression database of FIG. 3B according to an implementation described herein.

FIG. 4B is a diagram illustrating exemplary components of expression database 375 according to an implementation described herein. As shown in FIG. 4B, expression database 375 may include one or more entries. Each entry may include a feature vector field 430 and an associated expression field 435. Feature vector field 430 may store a particular feature vector 430 and expression field 435 may include information identifying a particular facial expression associated with the particular feature vector. For example, a feature vector {(head_position, neutral), (eyebrows, neutral), (cheekbones, raised), (mouth_corners, up), (mouth_center, neutral)} may be associated with avatar image "avatar35_smile_expression_1."

Although FIG. 4B shows exemplary components of expression database 375, in other implementations, expression database 375 may include fewer components, different components, differently arranged components, or additional components than depicted in FIG. 4B.

Figure 4C:
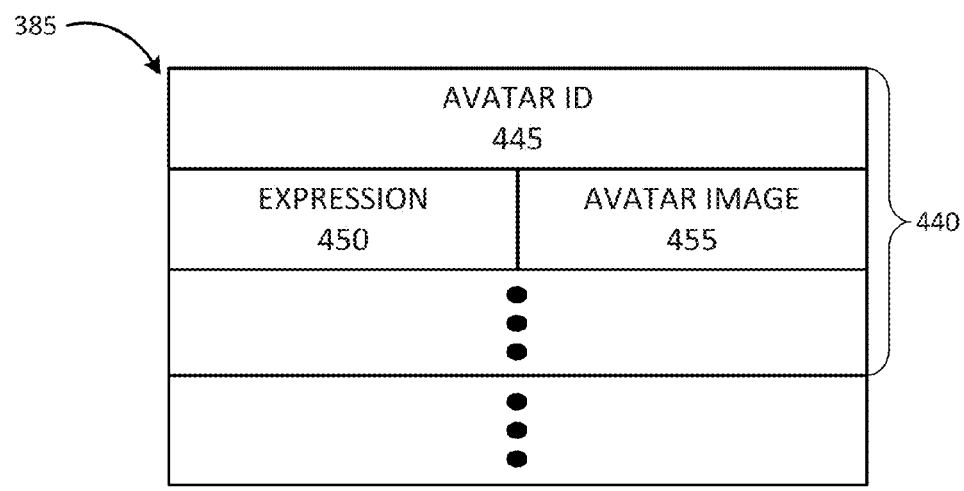
FIG. 4C is a diagram illustrating exemplary components of an avatar database of FIG. 3B according to an implementation described herein.

FIG. 4C is a diagram illustrating exemplary components of avatar database 385 according to an implementation described herein. As shown in FIG. 4C, avatar database 385 may include one or more avatar records 440 (referred to herein collectively as "avatar records 440" and individually as "avatar record 440"). Avatar record 440 may store information associated with a particular avatar. Avatar record 440 may include an avatar ID field 445 and one or more entries that include an expression field 450 and a corresponding avatar image field 455.

Avatar ID field 445 may include information that identifies a particular avatar. Expression field 450 may include information identifying a particular expression. Avatar image field 455 may store a particular avatar image, and/or another representation of an avatar facial expression, associated with the particular expression.

Although FIG. 4C shows exemplary components of avatar database 385, in other implementations, avatar database 385 may include fewer components, different components, differently arranged components, or additional components than depicted in FIG. 4C.

Figure 5:
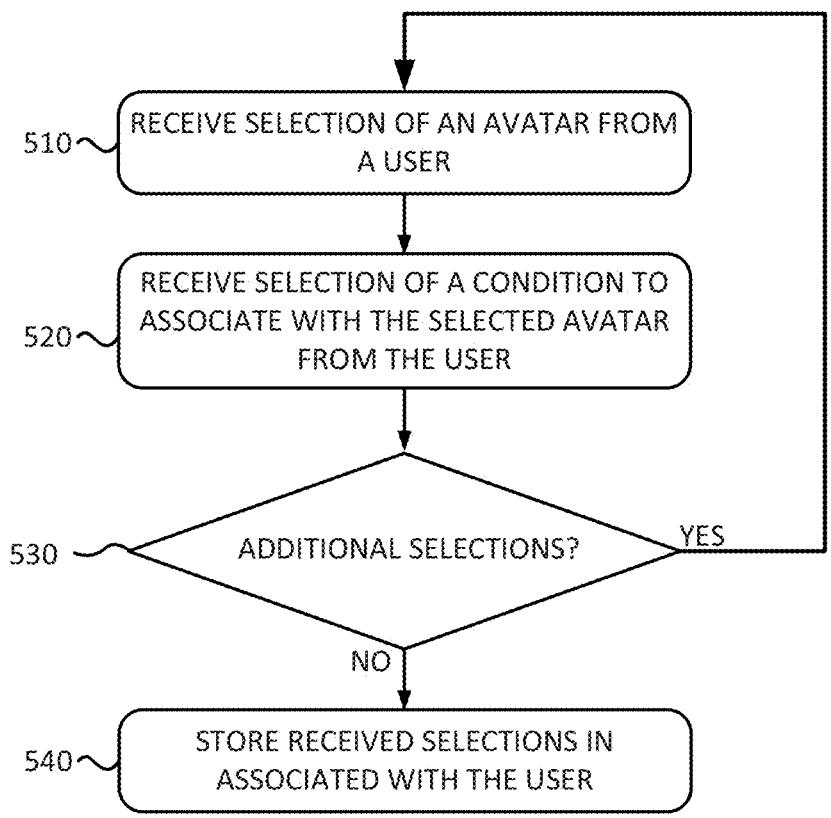
FIG. 5 is a flowchart of an exemplary process for selecting one or more avatars according to an implementation described herein.

FIG. 5 is a flowchart of an exemplary process for selecting one or more avatars according to an implementation described herein. In one implementation, the process of FIG. 5 may be performed by video avatar system 130. In other implementations, some or all of the process of FIG. 5 may be performed by another device or a group of devices separate from video avatar system 130 and/or including video avatar system 130.

The process of FIG. 5 may include receiving a selection of an avatar from a user (block 510). For example, a user may select an avatar available in avatar database 330 or may upload an avatar from user device 110 to avatar database 330. A selection of a condition to be associated with the selected avatar may be received from the user (block 520). The user may select to associate the selected avatar with a particular condition. In one example, the user may select to use the selected avatar for all conditions. In another example, the use may specify a particular condition.

As an example, a user may specify a particular location for the avatar (e.g., a home location, a work location, etc.). For example, a user may select to use a first avatar when the user is at work and may select to use a second avatar when the user is at home. As another example, a user may specify a particular time of day for the avatar. For example, a user may select to use a first avatar during business hours and may select to use a second avatar during evening hours. As yet another example, a user may specify a particular day of the week for the avatar. For example, a user may select to use a first avatar during weekdays and may select to use a second avatar during weekends. As yet another example, a user may specify a particular group of contacts for the avatar. For example, a user may select to use a first avatar for a group of contacts designated as business contacts and may select to use a second avatar for a group of contacts designated as family contacts. As yet another example, a user may specify a particular status for the avatar. For example, the user may select a first avatar for a busy status associated with user device 110 and may select a second avatar for an available status associated with user device 110.

A determination may be made as to whether there are additional selections (block 530). For example, avatar configurator 320 may determine whether the user has selected another avatar. If it is determined that there are additional selections (block 530—YES), processing may return to block 510. If it is determined that there are no additional selections (block 530—NO), the received selections may be stored in association with the user. For example, avatar configurator 320 may generate a user record 410 that includes one or more avatars and associated conditions selected by the user.

Figure 6:
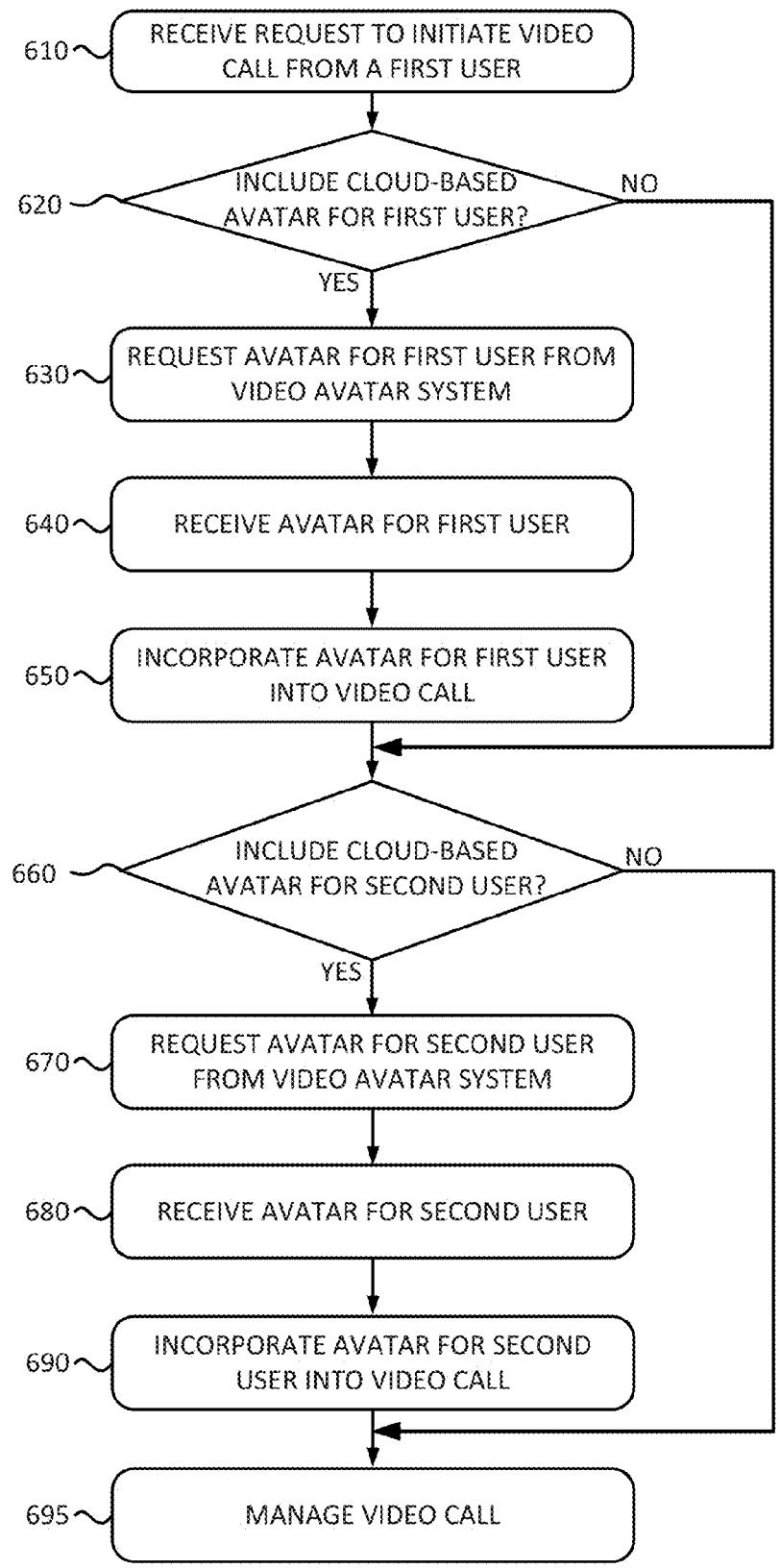
FIG. 6 is a flowchart of an exemplary process for obtaining static avatars for a video call according to an implementation described herein.

FIG. 6 is a flowchart of an exemplary process for obtaining static avatars for a video call according to an implementation described herein. In one implementation, the process of FIG. 6 may be performed by video calling system 140. In other implementations, some or all of the process of FIG. 6 may be performed by another device or a group of devices separate from video calling system 140 and/or including video calling system 140.

The process of FIG. 6 may include receiving a request to initiate a video call from a first user (block 610). For example, the first user may initiate a video call to a second user from user device 110-A. User device 110-A may contact video calling system 140 to request to establish a video call session with user device 110-B, associated with the second user.

A determination may be made as to whether to include a cloud-based avatar for the first user (block 620). For example, avatar manager 355 of video calling system 140 may determine whether the first user has selected to use an avatar for the video call. In some implementations, when the first user selects to initiate a video call, user device 110-A may prompt the first user to indicate whether the first user would like to use an avatar for the video call. In other implementations, avatar manager 355 may determine whether to use an avatar for the first user based on one or more criteria. For example, avatar manager 355 may determine to use an avatar for the first user when a bandwidth and/or a signal strength associated with a connection between user device 110-A and network 120 is below a particular threshold. As another example, avatar manager 355 may determine that the first user has indicated a condition to be associated with an avatar and that the condition has been satisfied.

If it is determined that a cloud-based avatar is not to be used for the first user (block 620—NO), processing may continue to block 660. If it is determined that a cloud-based avatar is to be used for the first user (block 620—YES), an avatar for the first user may be requested from a video avatar system (block 630). For example, avatar manager 355 may send a request to video avatar system 130, along with information identifying the first user. Furthermore, avatar manager 355 may include information relating to one or more conditions associated with the first user (e.g., a location associated with the first user, a status associated with the first user, etc.).

An avatar for the first user may be received (block 640) and may be incorporated into the video call (block 650). For example, avatar manager 355 may replace the video stream from user device 110-A with the avatar received from video avatar system 130 and may provide the avatar to user device 110-B.

A determination may be made as to whether to include a cloud-based avatar for the second user (block 660). For example, avatar manager 355 of video calling system 140 may determine whether the second user has selected to user an avatar for the video call. In some implementations, when the second user selects to answer an incoming video call from the first user, user device 110-B may prompt the second user to indicate whether the second user would like to use an avatar for the video call. In other implementations, avatar manager 355 may determine whether to use an avatar for the second user based on one or more criteria. For example, avatar manager 355 may decide to use an avatar for the second user when a bandwidth and/or a signal strength associated with a connection between user device 110-B and network 120 is below a particular threshold. As another example, avatar manager 355 may determine that the second user has indicated a condition to be associated with an avatar and that the condition has been satisfied.

If it is determined that a cloud-based avatar is not to be used for the second user (block 660—NO), processing may continue to block 695. If it is determined that a cloud-based avatar is to be used for the second user (block 660—YES), an avatar for the second user may be requested from a video avatar system (block 670). For example, avatar manager 355 may send a request to video avatar system 130, along with information identifying the second user. Furthermore, avatar manager 355 may include information relating to one or more conditions associated with the second user (e.g., a location associated with the second user, a status associated with the second user, etc.).

An avatar for the second user may be received (block 680) and may be incorporated into the video call (block 690). For example, avatar manager 355 may replace the video stream from user device 110-B with the avatar received from video avatar system 130 and may provide the avatar to user device 110-A.

The video call may continue to be managed (block 695). For example, video call manager 350 may maintain the video call session until either the first user or the second user hangs up. After the first user or the second user hangs up, video call manager 350 may terminate the video call session.

Figure 7:
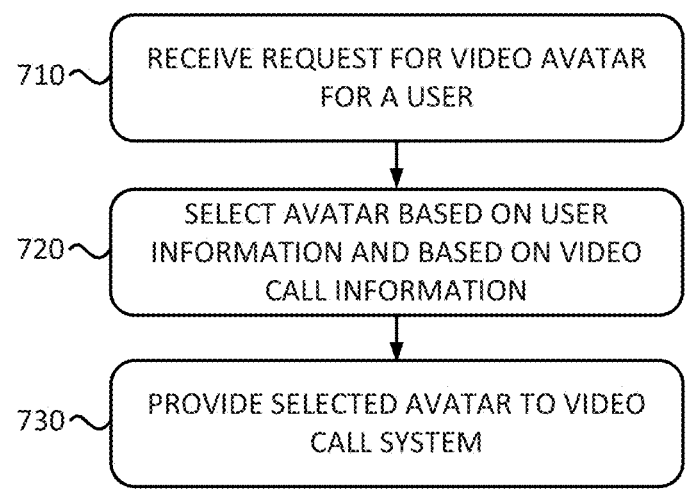
FIG. 7 is a flowchart of an exemplary process for providing a static avatar for a video call according to an implementation described herein.

FIG. 7 is a flowchart of an exemplary process for providing a static avatar for a video call according to an implementation described herein. In one implementation, the process of FIG. 7 may be performed by video avatar system 130. In other implementations, some or all of the process of FIG. 7 may be performed by another device or a group of devices separate from video avatar system 130 and/or including video avatar system 130.

The process of FIG. 7 may include receiving a request for a video avatar for a user (block 710). For example, video calling system interface 360 may receive a request for a video avatar for a particular user. The request may include information identifying the particular user, such as an identifier associated with user device 110.

An avatar may be selected based on user information and based on video call information (block 720). For example, avatar processor 350 may access user database 340 to identify a user record 410 associated with the particular user using the identifier, associated with the particular user, which was included in the received request. Avatar processor 350 may determine whether any conditions are associated with an avatar identified in user record 410. For example, user record 410 may include a single avatar entry without any specified conditions and avatar processor 350 may select the single avatar without having to check whether any conditions are satisfied. As another example, user record 410 may include an avatar associated with a condition based on user information, such as user location. The request for an avatar may include user information, such as the user location, and avatar processor 350 may determine whether the user's location matches a location, or a range of locations, indicated as a condition for the avatar. If the user's location matches the location specified in condition field 420 of an entry in user record 410, the corresponding avatar, identified in avatar field 425, may be selected by avatar processor 350.

The selected avatar may be provided to a video call system (block 730). For example, avatar processor 350 may generate a video stream that includes the selected avatar and the video stream may replace the video stream associated with the user. The video stream may be provided to video calling system 140 and incorporated into the video call.

Figure 8:
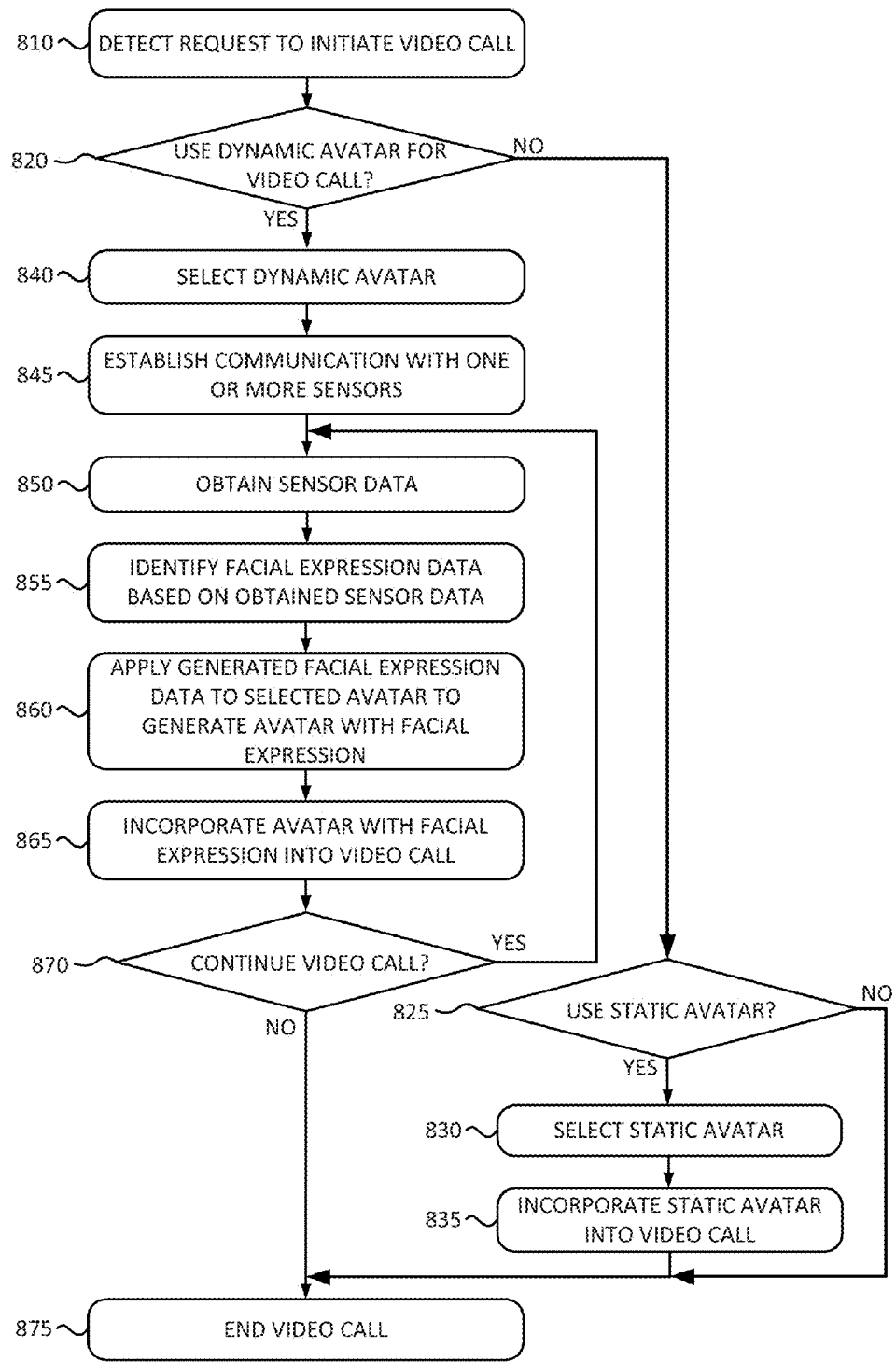
FIG. 8 is a flowchart of a first exemplary process for using a dynamic avatar in a video call according to an implementation described herein.

FIG. 8 is a flowchart of a first exemplary process for using a dynamic avatar in a video call according to an implementation described herein. In one implementation, the process of FIG. 8 may be performed by user device 110. In other implementations, some or all of the process of FIG. 8 may be performed by another device or a group of devices separate from user device 110 and/or including user device 110.

The process of FIG. 8 may include detecting a request to initiate a video call (block 810). For example, a user may activate a video calling application on user device 110. A determination may be made as to whether to use a dynamic avatar for the video call (block 820). In some implementations, user device 110 may prompt the user to indicate whether the user would like to use an avatar for the video call. The user may select to use either a dynamic or a static avatar. In other implementations, a determination as to whether to use a dynamic avatar may be made without an explicit selection from the user. For example, a determination to use a dynamic avatar may be made based on a condition associated with the user, such as a particular location, a particular time of day, a particular day of week, a particular status associated with the user, a particular set of contacts, and/or another type of condition. The particular condition associated with the user may be used to select a particular dynamic avatar. As another example, a determination to use a dynamic avatar may be made based on a bandwidth and/or signal strength associated with a connection between user device 110 and network 120. For example, if the available bandwidth is above a particular threshold, a dynamic avatar may be selected and if the available bandwidth is below the particular threshold, a static avatar may be selected. A static avatar may require less bandwidth, as a static avatar may only require the transmission of a single image, while a dynamic avatar may require the transmission of a new image each time the user's facial expression changes.

If it is determined that a dynamic avatar is not to be used (block 820—NO), a determination may be made as to whether to use a static avatar (block 825). For example, a determination as to whether to use a static avatar may be made based on an explicit selection by the user or based on a condition associated with the user (e.g., as explained above with reference to block 620 of FIG. 6).

If it is determined that a static avatar is to be used (block 825—YES), a static avatar may be selected (block 830) and the static avatar may be incorporated into the video call (block 835). For example, avatar selector 380 may select an avatar record 440 from avatar database 385 based on a determined condition associated with the user. The selected avatar may be provided as a static image that may not change during the video call. If it is determined that a static avatar is not to be used (block 825—NO), processing of the video call with respect to avatar may end and the video call may proceed without use of avatars until the video call is ended (block 875).

Returning to block 820, if it is determined that a dynamic avatar is to be used (block 820—YES), a dynamic avatar may be selected (block 830). For example, avatar selector 380 may select an avatar record 440 from avatar database 385 based on a determined condition associated with the user. A facial expression associated with the selected avatar may be changed based on the user's facial expressions, as described below.

Communication may be established with one or more sensors (block 840). For example, user device 110 may establish communication with sensor 115. Sensor 115 may include, for example, a pair of cameras mounted to a headpiece worn by the user. Sensor 115 and user device 110 may communicate via, for example, a Bluetooth wireless connection.

Sensor data may be obtained (block 850). For example, sensor 115 may capture an image of the user's head and/or face and provide the captures image to user device 110. Facial expression data may be generated based on the obtained sensor data (block 860). For example, expression processor 370 may analyze an image received via sensor interface 360. For example, expression processor 370 may perform a feature detection algorithm, such as an edge detection algorithm, a block detection algorithm, a template detection algorithm, and/or another type of algorithm to identify features of the user's face, such as the user's head position, a position of the user's eyebrows, a position of the user's eyes, a position of the user's lips and/or mouth, and/or a position of another feature of the user's face. Expression processor 370 may generate a feature vector based on the feature detection algorithm and may identify a particular facial expression based on the generated feature vector by accessing expression database 375. If sensor device 115 includes additional sensors, such as position sensors and/or pressure sensors, expression processor 370 may obtain data from the additional sensors and incorporate the data from the additional sensors to generate the facial expression data.

The generated facial expression data may be applied to the selected avatar to generate an avatar with a facial expression (block 860) and the avatar with the facial expression may be incorporated into the video call (block 865). For example, avatar selector 380 may identify an avatar image that includes a facial expression that corresponds to the facial expression in the image of the user's face included in the obtained sensor data by accessing avatar database 380. The identified avatar image may be incorporated into the video stream and sent by user device 110 to video calling system 140 in place of the image of the user's face included in the obtained sensor data.

A determination may be made as to whether to continue the video call (block 870). For example, the video call may continue until the user, or the other party, hangs up. If it is determined that the video call is to be continued (block 870—YES), processing may return to block 850 to obtain sensor data. If it is determined that the video call is not to be continued (block 870—NO), the video call may be ended (block 875). For example, user device 110 may end the video call session.

While FIG. 8 has been described as being performed by user device 110, in other implementations, some or all of the process of FIG. 8 may be performed by video avatar system 130. For example, user device 110 may send a video stream, which includes images of the user's face obtained by sensor 115, to video avatar system 130. Video avatar system 130 may convert the images to avatar images using the process described above with reference to FIG. 8 and may send the avatar images to video calling system 140. In some implementations, user device 110 and video avatar system 130 may communicate with each other to determine how much processing should be performed by user device 110 and how much processing should be performed by video avatar system 130. For example, if user device 110 is low on resources (e.g., memory, processing time, etc.), user device 110 may send the video stream to video avatar system 130. Alternatively, user device 110 may perform some processing of images from the video stream and video avatar system 130 may perform additional processing of the images.

Figure 9:
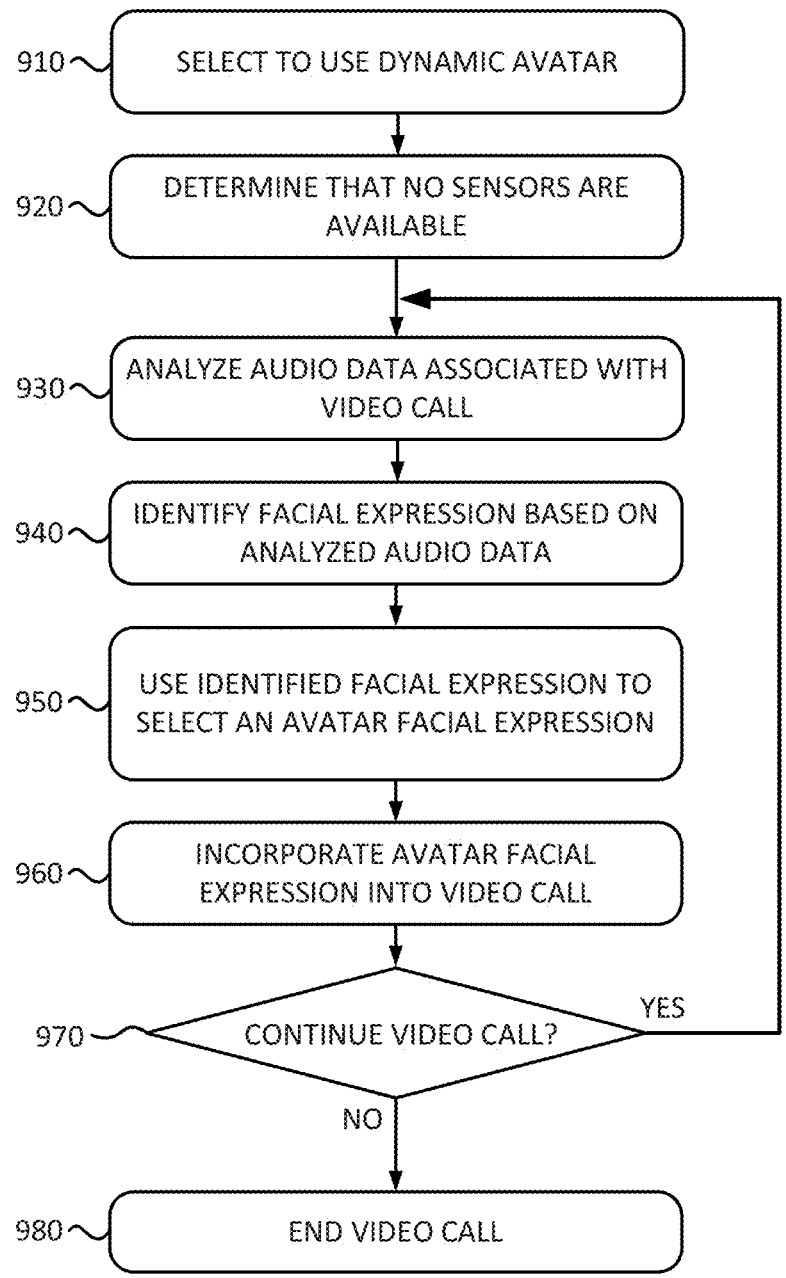
FIG. 9 is a flowchart of a second exemplary process for using a dynamic avatar in a video call according to an implementation described herein.

FIG. 9 is a flowchart of a second exemplary process for using a dynamic avatar in a video call according to an implementation described herein. In one implementation, the process of FIG. 9 may be performed by user device 110. In other implementations, some or all of the process of FIG. 9 may be performed by another device or a group of devices separate from user device 110 and/or including user device 110.

The process of FIG. 9 may include selecting to use a dynamic avatar (block 910) and determining that no sensor data is available (block 920). For example, a user may select to use a dynamic avatar and user device 110 may determine that communication with sensor 115 is not available (e.g., user device 110 may not be associated with sensor 115, sensor 115 may be out of power, sensor 115 may be malfunctioning, etc.). Thus, no images of the user's face may be available to determine the user's facial expressions.

Audio data associated with the video call may be analyzed (block 930) and a facial expression may be identified based on the analyzed audio data (block 940). In some implementations, the audio data may be analyzed by expression processor 370 to determine whether the user is talking. If the user is not talking, a neutral facial expression may be selected. If the user is talking, one or more facial expressions may be selected that simulate a talking avatar figure. In other implementations, the audio data may be analyzed using a speech recognition process that determines a particular speech pattern and one or more facial expressions may be selected that simulate lip movement associated with the particular speech pattern.

The identified facial expression data may be used to select an avatar facial expression (block 950) and the avatar facial expression may be incorporated into the video call (block 960). For example, avatar selector 380 may identify an avatar image that includes a facial expression that corresponds to the facial expression in the image of the user's face included in the obtained sensor data by accessing avatar database 380. The identified avatar image may be incorporated into the video stream and sent by user device 110 to video calling system 140 in place of the image of the user's face included in the obtained sensor data.

A determination may be made as to whether to continue the video call (block 970). For example, the video call may continue until the user, or the other party, hangs up. If it is determined that the video call is to be continued (block 970—YES), processing may return to block 930 to continue to analyze audio data associated with the video call. If it is determined that the video call is not to be continued (block 970—NO), the video call may be ended (block 980). For example, user device 110 may end the video call session.

Figure 10:
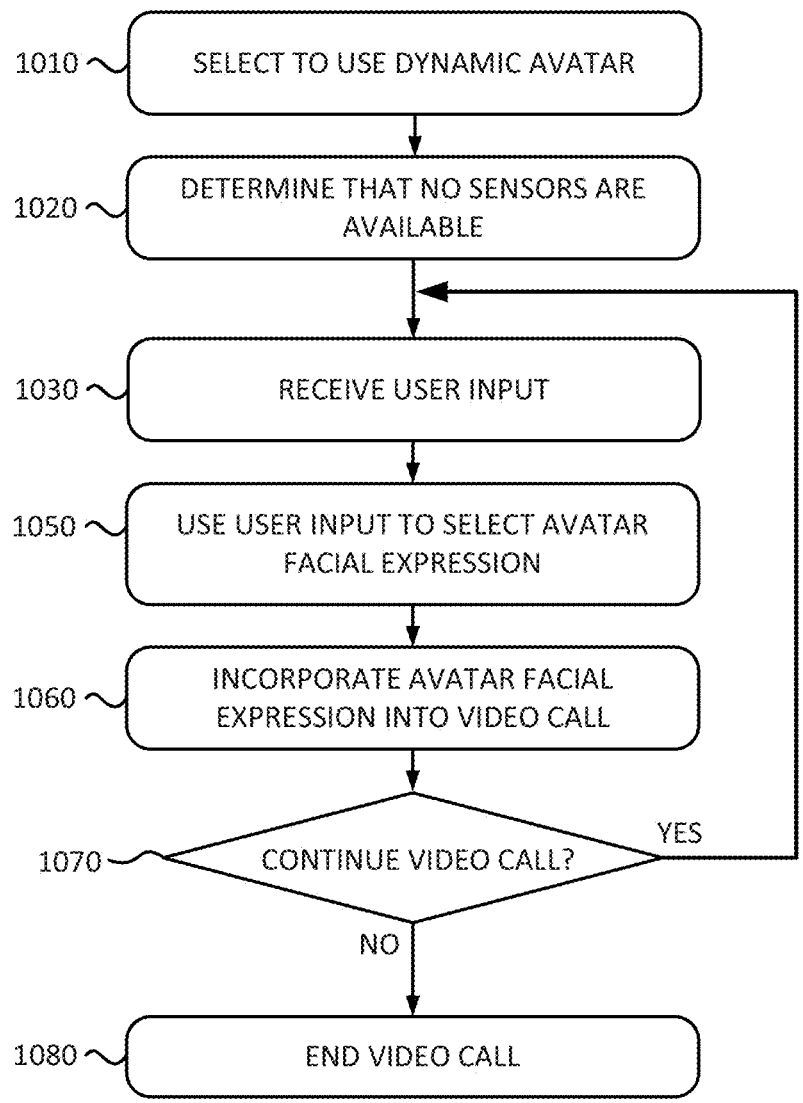
FIG. 10 is a flowchart of a third exemplary process for using a dynamic avatar in a video call according to an implementation described herein.

FIG. 10 is a flowchart of a third exemplary process for using a dynamic avatar in a video call according to an implementation described herein. In one implementation, the process of FIG. 10 may be performed by user device 110. In other implementations, some or all of the process of FIG. 10 may be performed by another device or a group of devices separate from user device 110 and/or including user device 110.

The process of FIG. 10 may include selecting to use a dynamic avatar (block 1010) and determining that no sensor data is available (block 1020). For example, a user may select to use a dynamic avatar and user device 110 may determine that communication with sensor 115 is not available (e.g., user device 110 may not be associated with sensor 115, sensor 115 may be out of power, sensor 115 may be malfunctioning, etc.). Thus, on images of the user's face may be available to determine the user's facial expressions.

User input may be received (block 1030) and the user input may be used to select an avatar facial expression (block 1040). In some implementations, the user may be provided with a list of selection objects, wherein each selection object corresponds to a particular facial expression. For example, the user may be presented with icons or thumbnails of avatar images, with each of the icons or thumbnails representing an avatar image with a particular facial expression. As another example, the user may be presented with a drop down menu, with each object in the drop down menu listing a particular facial expression.

In other implementations, the user may be presented with an avatar image that may be manipulated by the user through gestures. User device 110 may include a touchscreen and the user may perform gestures on the touch screen to manipulate the avatar image to generate a particular facial expression. For example, the user may raise the corners of the mouth of the avatar image to generate a smile, may raise the eyebrows of the avatar image to generate a surprised expression, may squeeze the corners of the mouth together to generate a pouting facial expression, etc.

Avatar selector 380 may select an avatar image based on the received user input. The identified avatar image may be incorporated into the video stream and sent by user device 110 to video calling system 140 in place of the image of the user's face included in the obtained sensor data. A determination may be made as to whether to continue the video call (block 1070). For example, the video call may continue until the user, or the other party, hangs up. If it is determined that the video call is to be continued (block 1070—YES), processing may return to block 1030 to continue to receive user input with respect to selection of avatar facial expressions. If it is determined that the video call is not to be continued (block 1070—NO), the video call may be ended (block 1080). For example, user device 110 may end the video call session.

Figure 11:
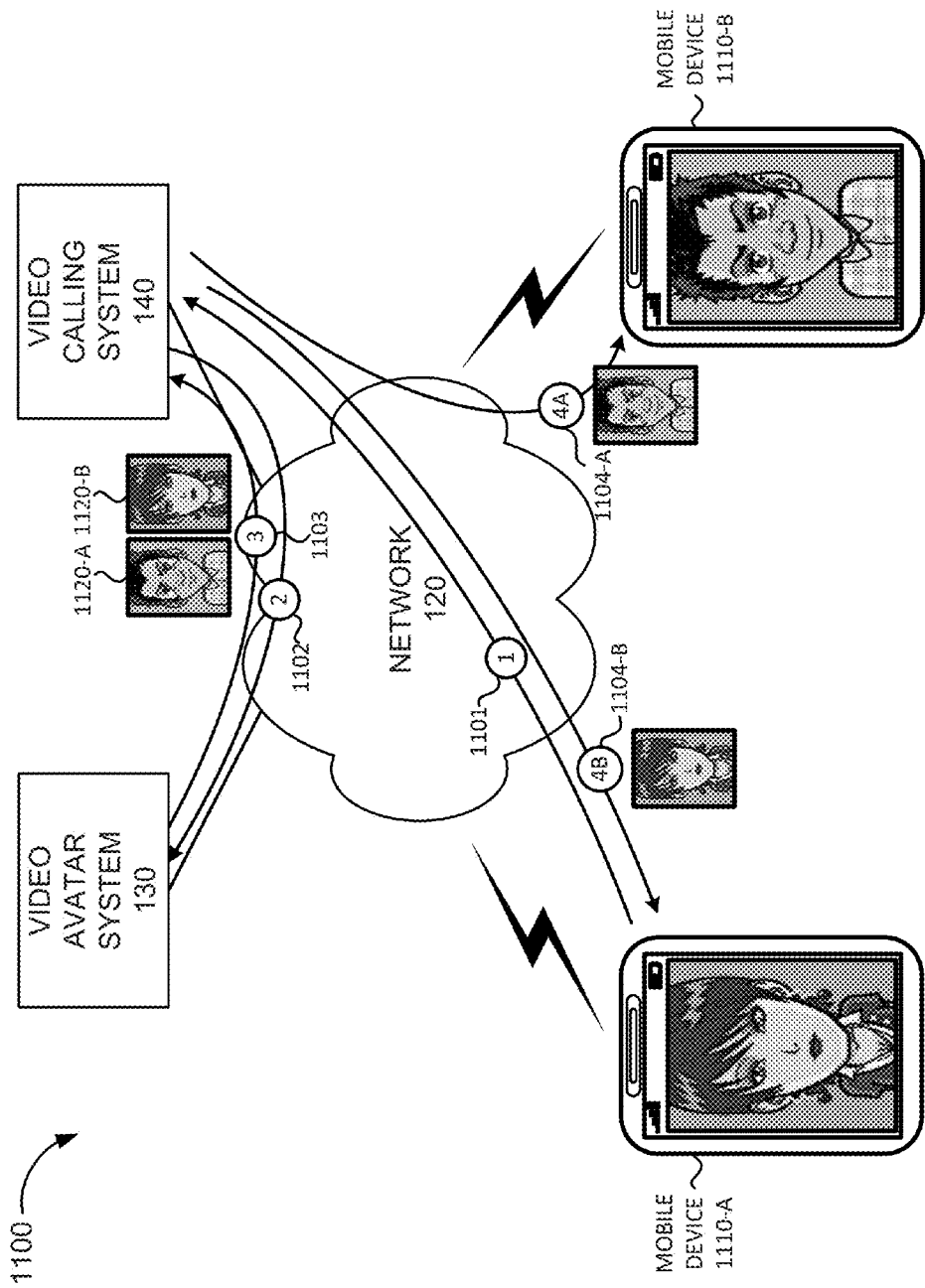
FIG. 11 is a diagram of an example of using static avatars in a video call according to an implementation described herein.

FIG. 11 is a diagram of an example 1100 of using static avatars in a video call according to an implementation described herein. Example 1100 may include mobile device 1110-A (corresponding to user device 110-A) and mobile device 1110-B (corresponding to user device 110-B). A first user, of mobile device 1110-A, may initiate a video call to a second user, of mobile device 1110-B. Mobile device 1110-A may send a request to video calling system 140 to establish a video call session between mobile device 1110-A and mobile device 1110-B (signal 1101). The signal may include a request to use a static avatar for the first user. Video calling system 140 may contact mobile device 1110-B with a request to set up the video call and mobile device 1110-B may activate a ring tone. The second user may answer the video call and may select to use a static avatar for the video call.

Video calling system 140 may request avatars for the first user and the second user from video avatar system 130 (signal 1102). Video avatar system 130 may select a first avatar 1120-A, associated with the first user, and may select a second avatar 1120-B, associated with the second user, based on information stored in user records 410, associated with the first user and the second user. Video avatar system 130 may send first avatar 1120-A and second avatar 1120-B to video calling system 140 (signal 1103). Video calling system 140 may replace a video stream to mobile device 1110-B with first avatar 1120-A, representing the first user associated with mobile device 1110-A (signal 1104-A). Furthermore, video calling system 140 may replace a video stream to mobile device 1110-A with second avatar 1120-B, representing the second user associated with mobile device 1110-B (signal 1104-B).

Figure 12A:
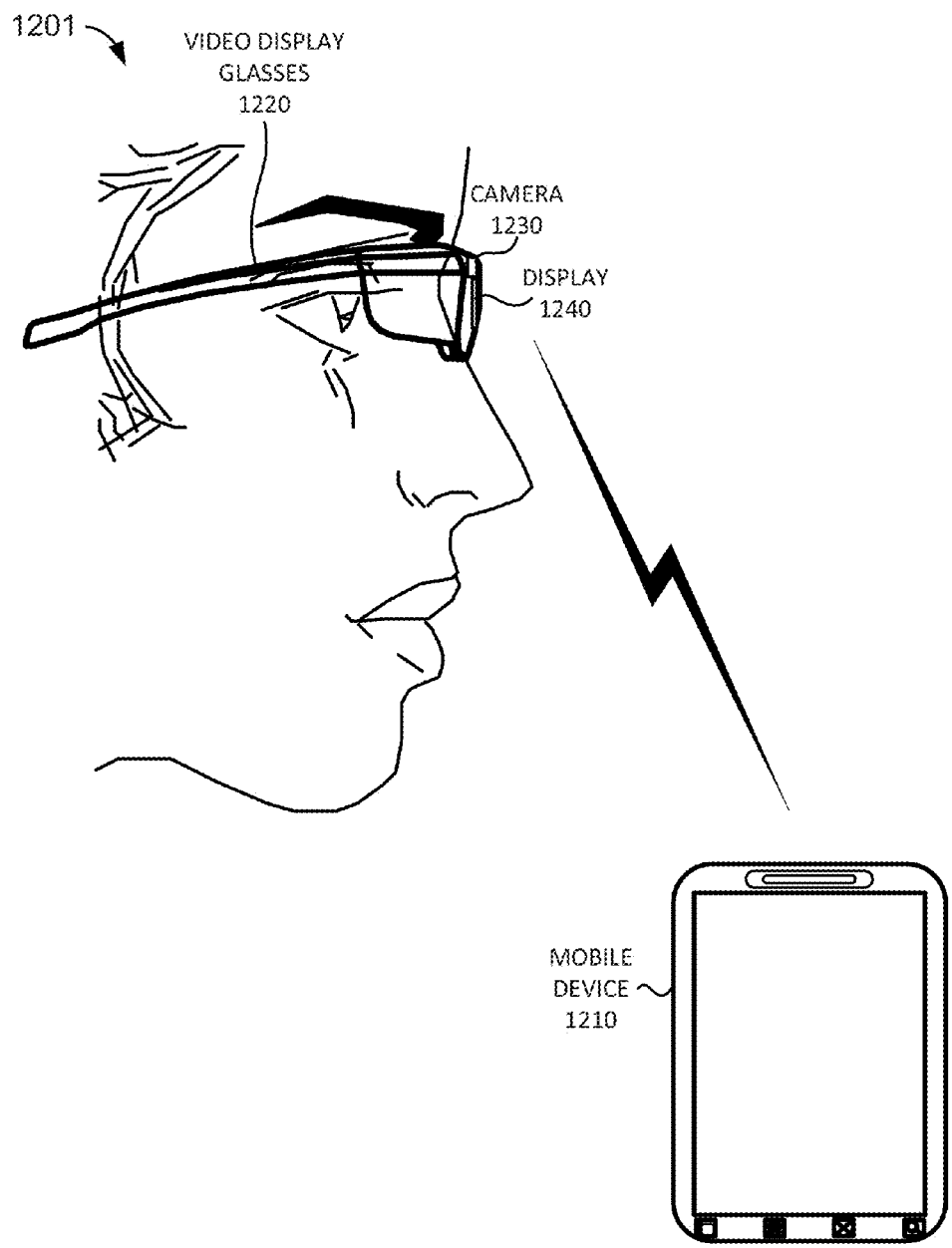

FIGS. 12A-12B are diagrams of an example of using a dynamic avatar in a video call according to an implementation described herein. FIG. 12A illustrates a system 1201 that includes mobile device 1210 (corresponding to user device 110) and video display glasses 1220 (corresponding to sensor 115). Video display glasses 1220 may include a camera 1230 and a display 1240 for each eye. Camera 1230 may record the position of the user's eyebrows, the user's eyes, the user's cheekbones, the user's mouth, and/or other the position of other features of the user's face. Display 1240 may display a video, associated with a video call, to the user. Video display glasses 1220 may include additional sensors (not shown in FIG. 12A), such as, for example, a position sensor to sense the position of the user's head.

FIG. 12B illustrates a sequence 1202 of facial expressions and corresponding avatar facial expressions that may be made by a user. Sequence 1202 may include a first facial expression 1252. First facial expression 1252 may correspond to a smiling facial expression. Mobile device 1220 (or video avatar system 130) may generate a first avatar facial expression 1262 based on the smiling facial expression and may send first avatar facial expression 1262 to a mobile device of the other user involved in the video call. Sometime later, the user may make a second facial expression 1254. Second facial expression 1254 may correspond to a talking facial expression. Mobile device 1220 (or video avatar system 130) may generate a second avatar facial expression 1264 based on the talking facial expression and may send second avatar facial expression 1264 to a mobile device of the other user involved in the video call. Sometime later, the user may make a third facial expression 1256. Third facial expression 1256 may correspond to a frowning facial expression. Mobile device 1220 (or video avatar system 130) may generate a third avatar facial expression 1266 based on the frowning facial expression and may send third avatar facial expression 1266 to a mobile device of the other user involved in the video call.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while series of blocks have been described with respect to FIGS. 5-10, the order of the blocks may be modified in other implementations. Further, non-dependent blocks may be performed in parallel.

It will be apparent that systems and/or methods, as described above, may be implemented in many different forms of software, firmware, and hardware in the implementations illustrated in the figures. The actual software code or specialized control hardware used to implement these systems and methods is not limiting of the embodiments. Thus, the operation and behavior of the systems and methods were described without reference to the specific software code—it being understood that software and control hardware can be designed to implement the systems and methods based on the description herein.

Further, certain portions, described above, may be implemented as a component that performs one or more functions. A component, as used herein, may include hardware, such as a processor, an ASIC, or a FPGA, or a combination of hardware and software (e.g., a processor executing software).

It should be emphasized that the terms "comprises"/"comprising" when used in this specification are taken to specify the presence of stated features, integers, steps or components but does not preclude the presence or addition of one or more other features, integers, steps, components or groups thereof.

No element, act, or instruction used in the present application should be construed as critical or essential to the embodiments unless explicitly described as such. Also, as used herein, the article "a" is intended to include one or more items. Further, the phrase "based on" is intended to mean "based, at least in part, on" unless explicitly stated otherwise.

What is claimed is:

1. A method, performed by a computer device, the method comprising:
   receiving, by the computer device, a request to initiate a video call from a first user device to a second user device;
   requesting, by the computer device, a first avatar for a first user associated with the first user device from a video avatar system that stores the first avatar remotely from the first user device;
   receiving, by the computer device, the first avatar from the video avatar system, wherein the first avatar corresponds to an image selected by the first user to be used as a replacement for a video stream for video calls associated with the first user; and
   incorporating, by the computer device, the first avatar into a video stream to the second user device.

2. The method of claim 1, further comprising:
   requesting, by the computer device, a second avatar for a second user associated with the second user device from the video avatar system;
   receiving, by the computer device, the second avatar from the video avatar system; and
   incorporating, by the computer device, the second avatar into a video stream to the first user device.

3. The method of claim 1, wherein the first user device includes:
   a mobile communication device associated with the first user;
   a personal computer device associated with the first user; or
   a video calling device associated with the first user.

4. The method of claim 1, further comprising:
   identifying a condition associated with the first user;
   providing information relating to the identified condition to the video avatar system; and
   wherein the first avatar has been selected by the first user to be associated with the condition.

5. The method of claim 4, wherein the condition associated with the first user includes at least one of:
   a location associated with the first user;
   a time of day;
   a day of week;
   a contact group associated with the second user; or
   a status associated with the first user.

6. A method, performed by a communication device, the method comprising:
   detecting, by the communication device, a request to initiate a video call by a user of the communication device;
   selecting, by the communication device, an avatar for the video call, wherein the avatar corresponds to an image selected by the user to be used as a replacement for a video stream for video calls associated with the user;
   determining, by the communication device, a facial expression associated with the user of the communication device;
   selecting, by the communication device, an avatar facial expression for the selected avatar, based on the determined facial expression; and
   incorporating, by the communication device, the selected avatar facial expression into a video stream associated with the video call.

7. The method of claim 6, wherein determining the facial expression associated with the user of the communication device includes:
   capturing an image of the user's face using a sensor device associated with communication device; and
   wherein determining the facial expression associated with the user of the communication device includes:
   analyzing the captured image to identify the facial expression associated with the user.

8. The method of claim 7, wherein the sensor associated with the communication device includes:

one or more cameras attached to a pair of glasses worn by the user.

9. The method of claim 7, wherein analyzing the captured image to identify the facial expression associated with the user includes one or more of:
   determining a position of the user's head in the captured image;
   determining a position of the user's eyebrows in the captured image;
   determining a position of the user's cheekbones in the captured image; or
   determining a position of the user's lips in the captured image.

10. The method of claim 6, wherein determining the facial expression associated with the user of the communication device includes:
   analyzing audio signals associated with the video call.

11. The method of claim 10, wherein analyzing audio signals associated with the video call includes:
   determining whether the user is talking; and
   wherein selecting the avatar facial expression for the selected avatar, based on the determined facial expression, includes:
   selecting a talking avatar facial expression, when the user is talking.

12. The method of claim 6, wherein determining the facial expression associated with the user of the communication device includes:
   determining the facial expression based on user input.

13. The method of claim 12, wherein determining the facial expression based on user input includes:
   receiving a selection of the avatar facial selection from a list of avatar facial expressions provided to the user; or
   receiving user manipulation of an avatar image, wherein the user manipulation corresponds to a gesture performed by the user on the avatar image displayed by the communication device.

14. A communication device comprising:
   logic configured to:
      detect a request to initiate a video call by a user of the communication device;
      select an avatar for the video call, wherein the avatar corresponds to an image selected by the user to be used as a replacement for a video stream for video calls associated with the user;
      determine a facial expression associated with the user of the communication device;
      select an avatar facial expression for the selected avatar, based on the determined facial expression; and
      incorporate the selected avatar facial expression into a video stream associated with the video call.

15. The communication device of claim 14, wherein when the logic is configured to determine the facial expression associated with the user of the communication device, the logic is further configured to:
   capture an image of the user's face using a sensor device associated with communication device; and
   wherein, when the logic is configured to determine the facial expression associated with the user of the communication device, the logic is further configured to:
   analyze the captured image to identify the facial expression associated with the user.

16. The communication device of claim 15, wherein the sensor device associated with the communication device includes:
   one or more cameras attached to glasses worn by the user.

17. The communication device of claim 15, wherein when the logic is configured to analyze the captured image to identify the facial expression associated with the user, the logic is further configured to one or more of:
   determine a position of the user's eyebrows in the captured image;
   determine a position of the user's cheekbones in the captured image; or
   determine a position of the user's lips in the captured image.

18. The communication device of claim 14, wherein when the logic is configured to determine the facial expression associated with the user of the communication device, the logic is further configured to:
   determine whether the user is talking; and
   wherein, when the logic is configured to select the avatar facial expression for the selected avatar, based on the determined facial expression, the logic is further configured to:
   select a talking avatar facial expression, when the user is talking.

19. The communication device of claim 14, wherein when the logic is configured to determine the facial expression associated with the user of the communication device, the logic is further configured to:
   determine the facial expression based on user input.

20. The communication device of claim 19, wherein when the logic is configured to determine the facial expression based on user input, the logic is further configured to:
   receive a selection of the avatar facial selection from a list of avatar facial expressions provided to the user; or
   receive user manipulation of an avatar image, wherein the user manipulation corresponds to a gesture performed by the user on the avatar image displayed by the communication device.

* * * * *